(12) United States Patent
Herz

(10) Patent No.: US 7,432,981 B1
(45) Date of Patent: Oct. 7, 2008

(54) APPARATUS, SYSTEM, AND METHOD FOR PROCESSING DIGITAL AUDIO/VIDEO SIGNALS

(75) Inventor: William Samuel Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 596 days.

(21) Appl. No.: 11/012,033

(22) Filed: Dec. 13, 2004

(51) Int. Cl.
*H04N 5/46* (2006.01)

(52) U.S. Cl. .................................... 348/554

(58) Field of Classification Search ............... 348/554, 348/555, 553, 552, 725, 726, 729, 558; 725/38, 725/87
See application file for complete search history.

(56) References Cited

U.S. PATENT DOCUMENTS

| | | | |
|---|---|---|---|
| 5,553,140 A | 9/1996 | Kubota et al. | |
| 5,982,457 A * | 11/1999 | Limberg | 348/725 |
| 6,064,440 A | 5/2000 | Born et al. | |
| 6,124,854 A * | 9/2000 | Sartain et al. | 715/716 |
| 6,160,587 A | 12/2000 | Walker et al. | |
| 6,369,857 B1 | 4/2002 | Balaban et al. | |
| 6,609,977 B1 | 8/2003 | Shimizu et al. | |
| 6,694,518 B1 | 2/2004 | Dulac | |
| 6,700,588 B1 | 3/2004 | MacInnis et al. | |
| 6,725,463 B1 * | 4/2004 | Birleson | 725/151 |
| 6,731,347 B1 | 5/2004 | Takano et al. | |
| 6,757,025 B1 | 6/2004 | Takano et al. | |
| 6,972,803 B2 * | 12/2005 | Seth-Smith et al. | 348/558 |
| 2006/0001779 A1 * | 1/2006 | Favrat et al. | 348/725 |
| 2006/0075433 A1 * | 4/2006 | Gardes | 725/48 |

OTHER PUBLICATIONS

Aurelian Pop, Digital Television, 25 pages, un-dated.
Bill Slattery, Advanced Digital Video Encoders CCIR-601 YcrCb to NTSC/PAL: studio quality digital video at consumer video prices, Analog Dialogue, http://www.analog.com/library/analogDialogue/archives/30-4/Digital_Video.html, "Sep. 3, 2004 printing date", 6 pages.
Sonja Grgic, et al., Digital Television Transmission and Broadband Network Technologies, Department of Radiocommunications and Microwave Engineering Faculty of Electrical Engineering and Computing, University of Zagreb, "un-dated", 12 pages.
Marshall Brain, How Television Works-Video Signal, http://entertainment.howstuffworks.com/tv9.htm, "Aug. 5, 2004 printing date", 2 pages.
Marshall Brain, How Television Works-Color TV Signal, http://entertainment.howstuffworks.com/tv11.htm, "Aug. 5, 2004 printing date", 2 pages.
Marshall Brain, How Television Works-Digital TV, http://entertainment.howstuffworks.com/tv15.htm, "Aug. 5, 2004 printing date", 2 pages.
David Strachan, et al., An Introduction to Digital Television, SMPTE Tutorial, SMPTE Journal, Mar. 1995, pp. 118-119.
Bart Decanne, AD/DA conversion for HDTV applications. Communication System Design, "un-dated", 3 pages.
National Instruments, Anatomy of a Video Signal, NI Developer Zone, "Sep. 15, 2004 printing date", 5 pages.
Dallas Semiconductor, Maxim, Understanding Analog Video Signals, http://www.maxim-ic.com/appnotes.cfm/appnote_number/1184, "Sep. 15, 2004 printing date", 8 pages.

* cited by examiner

*Primary Examiner*—Paulos M Natnael
(74) *Attorney, Agent, or Firm*—Cooley Godward Kronish LLP

(57) ABSTRACT

Apparatus, system, and method for processing digital audio/video signals are described. In one embodiment, a decoder is configured to process an input signal having an analog television format. The decoder includes a signal detector, and the signal detector is configured to determine whether the input signal incorporates a digital television signal. The decoder also includes a signal extractor connected to the signal detector, and the signal extractor is configured to extract the digital television signal from the input signal based on determining that the input signal incorporates the digital television signal.

11 Claims, 4 Drawing Sheets

APPARATUS, SYSTEM, AND METHOD FOR PROCESSING DIGITAL AUDIO/VIDEO SIGNALS

BRIEF DESCRIPTION OF THE INVENTION

The invention relates generally to signal processing. More particularly, the invention relates to an apparatus, system, and method for processing digital audio/video signals.

BACKGROUND OF THE INVENTION

As television technology transitions from analog to digital, television signals can be provided in different formats. These formats include analog television formats as well as digital television formats. Typically, an analog television format specifies analog waveform characteristics, such as timing information, voltage levels, and analog modulation scheme. Examples of analog television formats include a composite video format, a S-video format, and a component video format. Typically, a digital television format specifies digital waveform characteristics, such as header information, digital compression scheme, and digital modulation scheme. Examples of digital television formats include the Advanced Television Standards Committee ("ATSC") format and the Digital Video Broadcast ("DVB") format. Advanced television systems are sometimes designed to cope with television signals having different formats. However, with evolving market requirements for supporting an existing or a new television format, additional hardware resources have been included to cope with television signals having that television format. Unfortunately, such additional hardware resources can lead to inefficiencies in terms of use of valuable die area on a chip.

It is against this background that a need arose to develop the apparatus, system, and method described herein.

SUMMARY OF THE INVENTION

In one innovative aspect, the invention relates to a decoder configured to process an input signal having an analog television format. In one embodiment, the decoder includes a signal detector, and the signal detector is configured to determine whether the input signal incorporates a digital television signal. The decoder also includes a signal extractor connected to the signal detector, and the signal extractor is configured to extract the digital television signal from the input signal based on determining that the input signal incorporates the digital television signal.

In another innovative aspect, the invention relates to an encoder configured to process a digital television signal. In one embodiment, the encoder includes a signal generator, and the signal generator is configured to generate, based on an analog television format, an output signal that incorporates the digital television signal. The signal generator is configured to generate an indication that the output signal incorporates the digital television signal.

In another innovative aspect, the invention relates to a processing apparatus. In one embodiment, the processing apparatus includes an input port. The processing apparatus also includes a decoder connected to the input port, and the decoder is configured to receive, via the input port, a first input signal having an analog audio/video format. The decoder is configured to determine that the first input signal incorporates a digital audio/video signal, and the decoder is configured to extract the digital audio/video signal from the first input signal. The processing apparatus further includes an output engine connected to the decoder, and the output engine is configured to process the digital audio/video signal to generate at least one of an audio output and a video output.

In a further innovative aspect, the invention relates to a method of processing a digital television signal. In one embodiment, the method includes generating, based on an analog television format, an output signal that incorporates the digital television signal, wherein generating the output signal includes incorporating at least one of an audio content and a video content associated with the digital television signal in the output signal. The method also includes transmitting the output signal via a communication channel associated with the analog television format.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
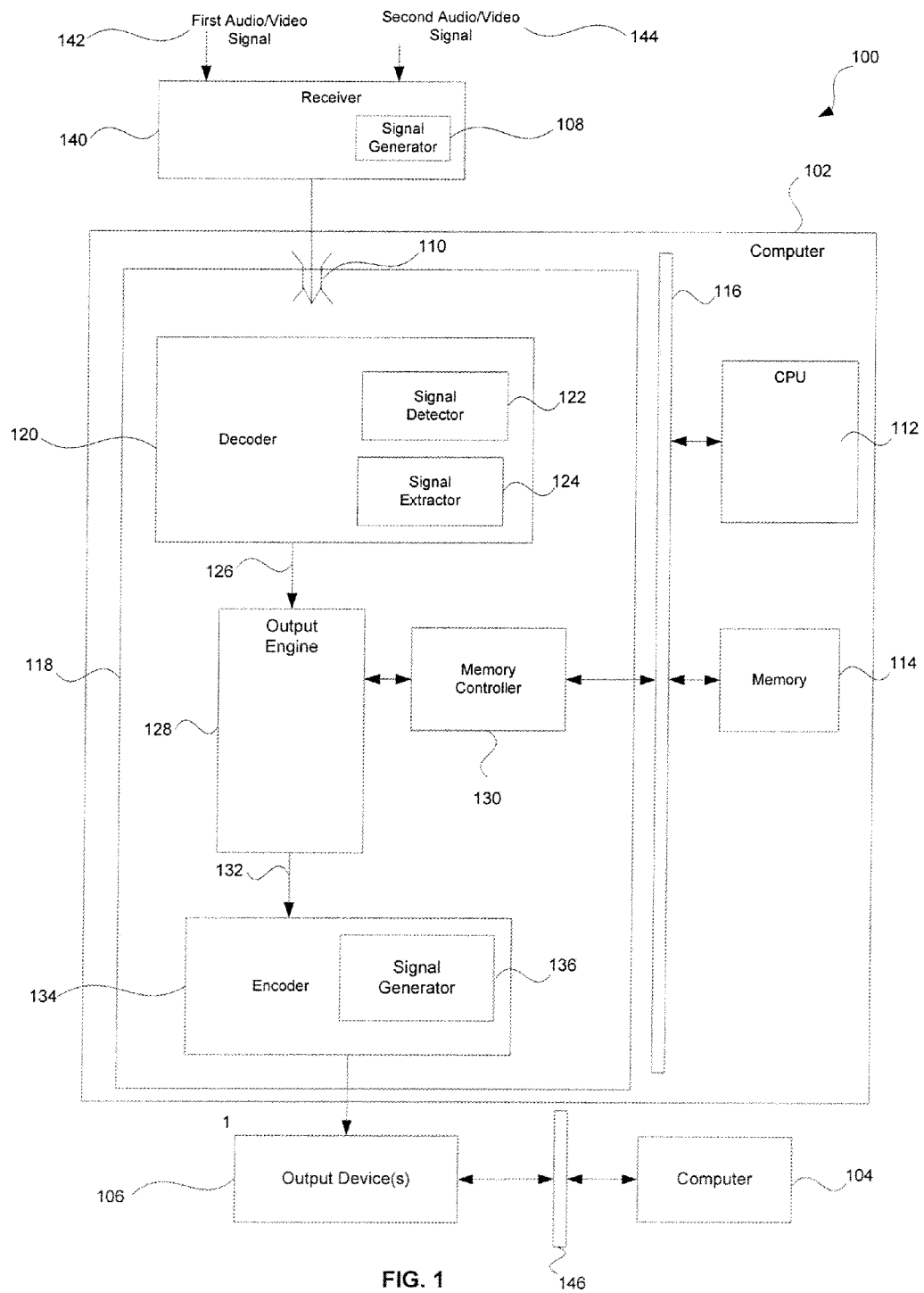
FIG. 1 illustrates a computer system that can be operated in accordance with an embodiment of the invention.

FIG. 1 illustrates a computer system 100 that can be operated in accordance with an embodiment of the invention. The computer system 100 includes computers 102 and 104 that are connected via a communication channel 146, which can be any wire or wireless communication channel. While two computers 102 and 104 are illustrated in FIG. 1, it is contemplated that more or less computers can be included depending on the particular implementation. The computers 102 and 104 can be implemented in a similar fashion, and each of the computers 102 and 104 can be, for example, a desktop computer, a server computer, a laptop computer, a palm-sized computer, a tablet computer, a game console, a set-top box, a portable wireless terminal such as a personal digital assistant or a cellular telephone, a computer-based simulator, or any other device with signal processing capability. As illustrated in FIG. 1, the computer system 100 also includes a receiver 140 and a set (i.e., one or more) of output devices 106, which are connected to the computer 102.

During operation, the receiver 140 receives a first audio/video signal 142 having a particular audio/video format and transmits the first audio/video signal 142 to the computer 102. In the illustrated embodiment, the first audio/video signal 142 is an analog audio/video signal having a particular analog audio/video format. The first audio/video signal 142 includes either of, or both, an audio content and a video content associated with a presentation, such as a movie, a music video, a video conference, a sports show, a television show, or any other captured occurrence or performance. The receiver 140 can receive the first audio/video signal 142 from any of a number of sources, such as a cable or satellite broadcast network, a radio broadcast network, a set-top box, or an image acquisition device. Depending on the particular format of the first audio/video signal 142, the receiver 140 can process the first audio/video signal 142 prior to its transmission to the computer 102. For example, the first audio/video signal 142 can be an analog television signal having a particular analog television format, and the receiver 140 can perform a number of signal processing operations on the analog television signal, such as tuning, demodulation, and filtering operations. It is contemplated that the receiver 140 can incorporate audio content associated with a presentation in the analog television signal, such as by embedding, inserting, or superimposing the audio content in a horizontal blanking interval or a vertical blanking interval of the analog television signal. As another example, the first audio/video signal 142 can be an analog radio frequency signal having a particular analog radio frequency format, and the receiver 140 can perform a number of signal processing operations on the analog radio frequency signal.

As illustrated in FIG. 1, the receiver 140 also receives a second audio/video signal 144 having a different audio/video format and transmits the second audio/video signal 144 to the computer 102. In the illustrated embodiment, the second audio/video signal 144 is a digital audio/video signal having a particular digital audio/video format. While a single receiver 140 is illustrated in FIG. 1, it is contemplated that the computer system 100 can include a separate receiver to receive the second audio/video signal 144. As with the first audio/video signal 142, the second audio/video signal 144 includes either of, or both, an audio content and a video content associated with a presentation. The receiver 140 can receive the second audio/video signal 144 from any of a number of sources, such as a cable or satellite broadcast network, the Internet, a set-top box, or an image acquisition device. Depending on the particular format of the second audio/video signal 144, the receiver 140 can process the second audio/video signal 144 prior to its transmission to the computer 102. For example, the second audio/video signal 144 can be a digital television signal having a particular digital television format, and the receiver 140 can perform a number of signal processing operations on the digital television signal, such as tuning, demodulation, and filtering operations. As another example, the second audio/video signal 144 can be any other digital data stream having a particular digital compression scheme, and the receiver 140 can perform a number of signal processing operations on the digital data stream. In the illustrated embodiment, the receiver 140 includes a signal generator 108, which processes the second audio/video signal 144 prior to its transmission to the computer 102. As further discussed below, the signal generator 108 processes the second audio/video signal 144, such that the first audio/video signal 142 and the second audio/video signal 144 can be transmitted to the computer 102 via a common input port, namely an input port 110.

Referring to FIG. 1, the receiver 140 is connected to the computer 102 via the input port 110, which is configured to receive signals having the particular format of the first audio/video signal 142. During operation, the receiver 140 transmits the first audio/video signal 142 to the computer 102 via the input port 110. For example, the first audio/video signal 142 can be an analog television signal, and the input port 110 can be any conventional video connector, such as a conventional composite video connector, a conventional S-video connector, or a conventional component video connector. While a single input port 110 is illustrated in FIG. 1, it is contemplated that additional input ports can be included depending on the particular implementation. In particular, the number of input ports that are included typically depends on the particular format of the first audio/video signal 142 to be transmitted to the computer 102. For example, the first audio/video signal 142 can be an analog television signal, and, depending on the particular format of the analog television signal, the computer 102 can include a single input port, two input ports, or three input ports.

Referring to FIG. 1, the receiver 140 also transmits the second audio/video signal 144 to the input port 110. In the illustrated embodiment, the receiver 140 includes the signal generator 108, which processes the second audio/video signal 144 to allow its transmission to the input port 110. As discussed previously, the input port 110 is configured to receive signals having the particular format of the first audio/video signal 142. During operation, the signal generator 108 generates, based on the particular format of the first audio/video signal 142, an output signal that incorporates the second audio/video signal 144. In turn, the output signal serves as an input signal that is transmitted to the input port 110. While the output signal typically has, or is compliant with, the particular format of the first audio/video signal 142, it should be recognized that the output signal typically differs from an analog audio/video signal, such as the first audio/video signal 142. In particular, since the output signal incorporates digital content of the second audio/video signal 144, the output signal typically has to be processed in a different fashion as further discussed below. In the illustrated embodiment, the signal generator 108 also generates an indication that the output signal incorporates the second audio/video signal 144. The signal generator 108 can incorporate the indication in the output signal itself or can separately transmit the indication to the computer 102.

As illustrated in FIG. 1, the computer 102 includes a central processing unit ("CPU") 112 and a memory 114, which is connected to the CPU 112 via a bus 116. The memory 114 can include, for example, a random access memory ("RAM"), a read only memory ("ROM"), or both. In the illustrated embodiment, the computer 102 also includes a processing apparatus 118, which is connected to the CPU 112 and to the memory 114 via the bus 116. The processing apparatus 118 can be a graphics processing apparatus, such as a graphics processing unit ("GPU"). As further discussed below, the processing apparatus 118 processes the first audio/video signal 142 and the second audio/video signal 144 for presentation using the set of output devices 106. Alternatively, or in conjunction, the processing apparatus 118 processes the first audio/video signal 142 and the second audio/video signal 144 for transmission to the computer 104.

As illustrated in FIG. 1, the processing apparatus 118 includes the input port 110 and a decoder 120, which is connected to the input port 110. The processing apparatus 118 also includes an encoder 134 and an output engine 128, which is connected between the decoder 120 and the encoder 134 via buses 126 and 132. The buses 126 and 132 can be implemented in a similar fashion, and each of the buses 126 and 132 can be any conventional bus, such as a conventional 8 or 16 bit bus implemented in accordance with the International Telecommunication Union ("ITU")-Recommendation 656. It is contemplated that other types of wire or wireless communication channels can be used in place of, or in conjunction with, the buses 126 and 132. In the illustrated embodiment, the buses 126 and 132 are configured to transmit signals having a particular digital audio/video format.

During operation, the decoder 120 receives, via the input port 110, an input signal that corresponds to the first audio/video signal 142, and the decoder 120 transmits the first audio/video signal 142 to the output engine 128. Depending on the particular format of the first audio/video signal 142, the decoder 120 can process the first audio/video signal 142 prior to its transmission to the output engine 128. For example, the first audio/video signal 142 can be an analog television signal having a particular analog television format, and the decoder 120 can perform a number of signal processing operations on the analog television signal, such as chrominance/luminance separation operations. In the illustrated embodiment, the decoder 120 converts the first audio/video signal 142 into the digital audio/video format associated with the bus 126, such that the first audio/video signal 142 can be transmitted to the output engine 128 via the bus 126.

In the illustrated embodiment, the decoder 120 also receives, via the input port 110, an input signal that incorporates the second audio/video signal 144, and the decoder 120 transmits the second audio/video signal 144 to the output engine 128. In the illustrated embodiment, the decoder 120 includes a signal detector 122 and a signal extractor 124, which is connected to the signal detector 122. The signal detector 122 determines whether the input signal incorporates the second audio/video signal 144. In the illustrated embodiment, the signal detector 122 detects the presence of the second audio/video signal 144 based on identifying an indication that the input signal incorporates the second audio/video signal 144. As discussed previously, the indication can be incorporated in the input signal itself or can be separately transmitted by the signal generator 108. In turn, the signal extractor 124 extracts the second audio/video signal 144 from the input signal. Depending on the particular format of the second audio/video signal 144, the decoder 120 can process the second audio/video signal 144 prior to its transmission to the output engine 128. For example, the second audio/video signal 144 can be a digital television signal having a particular digital television format, and the decoder 120 can perform a number of signal processing operations on the digital television signal, such as demultiplexing operations. In the illustrated embodiment, the decoder 120 converts the second audio/video signal 144 into the digital audio/video format associated with the bus 126, such that the second audio/video signal 144 can be transmitted to the output engine 128 via the bus 126. While use of a common bus, namely the bus 126, can be desirable, it is contemplated that the second audio/video signal 144 can be transmitted to the output engine 128 via a separate bus.

Referring to FIG. 1, the output engine 128 includes either of, or both, an audio processing pipeline and a video processing pipeline. During operation, the output engine 128 receives the first audio/video signal 142 via the bus 126 and performs a number of signal processing operations on the first audio/video signal 142, such as blending, filtering, and scaling operations. Subsequent to performing such operations, the output engine 128 transmits the first audio/video signal 142 to the encoder 134 via the bus 132. In the illustrated embodiment, the output engine 128 also receives the second audio/video signal 144 via the bus 126. As with the first audio/video signal 142, the output engine 128 performs a number of signal processing operations on the second audio/video signal 144, such as blending, filtering, and scaling operations. It is contemplated that the second audio/video signal 144 can include compressed digital content, in which case the output engine 128 can perform decompression operations on the second audio/video signal 144. Subsequent to performing such operations, the output engine 128 transmits the second audio/video signal 144 to the encoder 134 via the bus 132. While use of a common bus, namely the bus 132, can be desirable, it is contemplated that the second audio/video signal 144 can be transmitted to the encoder 134 via a separate bus. It is contemplated that the output engine 128 can store either of, or both, the first audio/video signal 142 and the second audio/video signal 144 in the memory 114 prior to performing the signal processing operations discussed above. In some instances, the output engine 128 can perform compression operations on either of, or both, the first audio/video signal 142 and the second audio/video signal 144 to facilitate storage in the memory 114. As illustrated in FIG. 1, the output engine 128 is connected to the memory 114 via a memory controller 130, which serves as an interface between the output engine 128 and the memory 114. The memory controller 130 can be implemented to provide direct memory access to the memory 114.

Referring to FIG. 1, the encoder 134 receives the first audio/video signal 142 via the bus 132 and transmits the first audio/video signal 142 to the set of output devices 106. Depending on the particular format of the first audio/video signal 142, the encoder 134 can process the first audio/video signal 142 prior to its transmission to the set of output devices 106. The set of output devices 106 includes either of, or both, an audio output device such as a speaker and a video output device such as a television set or a computer monitor. As illustrated in FIG. 1, the set of output devices 106 also includes a communication device, which can be used to transmit the first audio/video signal 142 to the computer 104 via the communication channel 146. In the illustrated embodiment, the communication channel 146 is configured to transmit signals having the particular format of the first audio/video signal 142.

In the illustrated embodiment, the encoder 134 also receives the second audio/video signal 144 via the bus 132 and transmits the second audio/video signal 144 to the set of output devices 106. Depending on the particular format of the second audio/video signal 144, the encoder 134 can process the second audio/video signal 144 prior to its transmission to the set of output devices 106. In the illustrated embodiment, the encoder 134 includes a signal generator 136, which can be implemented and can operate in a similar fashion as the signal generator 108. In particular, the signal generator 136 processes the second audio/video signal 144, such that the first audio/video signal 142 and the second audio/video signal 144 can be transmitted to the computer 104 via a common communication channel, namely the communication channel 146. While use of a common communication channel can be desirable, it is contemplated that the second audio/video signal 144 can be transmitted to the computer 104 via a separate communication channel.

The various signal processing operations discussed above can be performed on the first audio/video signal 142 and the second audio/video signal 144 simultaneously or separately, such as in an interleaved or sequential fashion. Also, while the receiver 140 is separately illustrated from the computer 102, it is contemplated that the receiver 140 can be implemented within the computer 102, such as within the processing apparatus 118.

Advantageously, the illustrated embodiment allows a more efficient use of hardware resources as compared with an implementation having dedicated input ports and dedicated buses for different types of audio/video signals. This more efficient use of hardware resources can translate into a more efficient use of valuable die area, such as for a GPU. Also, this more efficient use of hardware resources can translate into efficiencies at a board or packaging level, such as by eliminating or reducing the need for digital interfaces such as FireWire connectors and Universal Serial Bus connectors. In particular, the illustrated embodiment allows use of a common input port to receive both analog content and digital content. Moreover, unlike an implementation having dedicated input ports and dedicated buses, the illustrated embodiment can be readily configured to process additional types of audio/video signals without requiring additional input ports and additional buses to be included. Furthermore, the illustrated embodiment allows digital content to be efficiently distributed via communication channels that are configured to transmit analog audio/video signals. For example, digital content can be locally distributed to receiving devices, such as wirelessly or using a home's internal cable television coaxial cable. In such manner, digital content can be efficiently distributed without a dependency on Wireless-Fidelity limitations or standards.

The foregoing provides a general overview of an embodiment of the invention. Attention next turns to FIG. 2, which illustrates a flowchart for processing a digital television signal, according to an embodiment of the invention.

Figure 2:
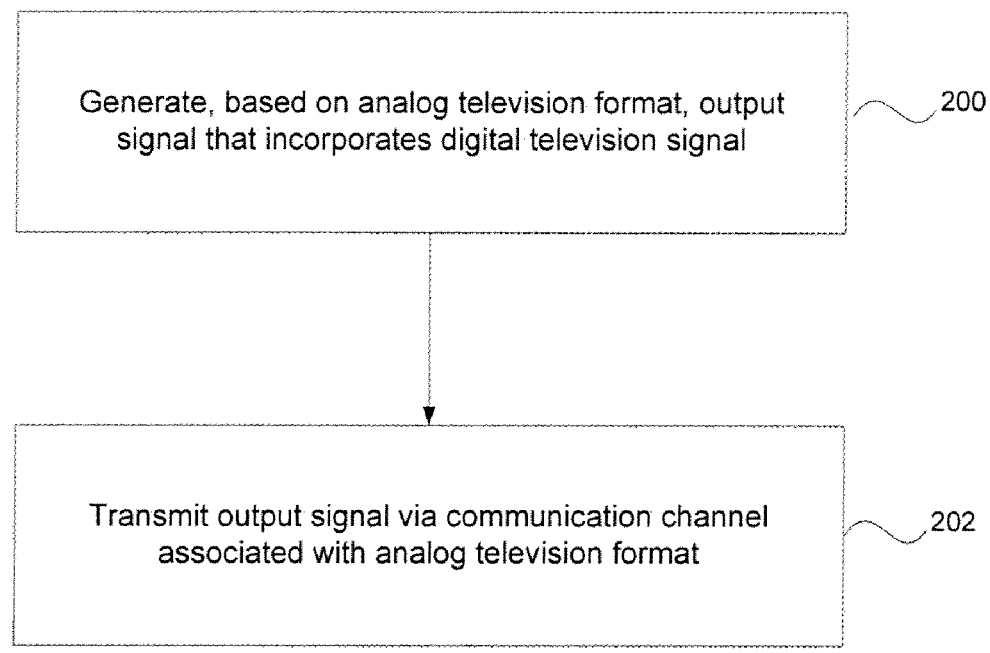
FIG. 2 illustrates a flowchart for processing a digital television signal, according to an embodiment of the invention.

The first operation illustrated in FIG. 2 is to generate, based on an analog television format, an output signal that incorporates the digital television signal (block 200). In the illustrated embodiment, an encoder includes a signal generator, and the signal generator generates the output signal by incorporating either of, or both, an audio content and a video content of the digital television signal in the output signal. Typically, the output signal that is generated has, or is compliant with, the analog television format. For certain implementations, the output signal is generated by modulating a carrier signal with the digital television signal. To allow a receiving device to detect the presence of the digital television signal, the signal generator also generates an indication that the output signal incorporates the digital television signal. This indication can be incorporated in the output signal itself or can be separately transmitted to the receiving device.

Figure 3A:
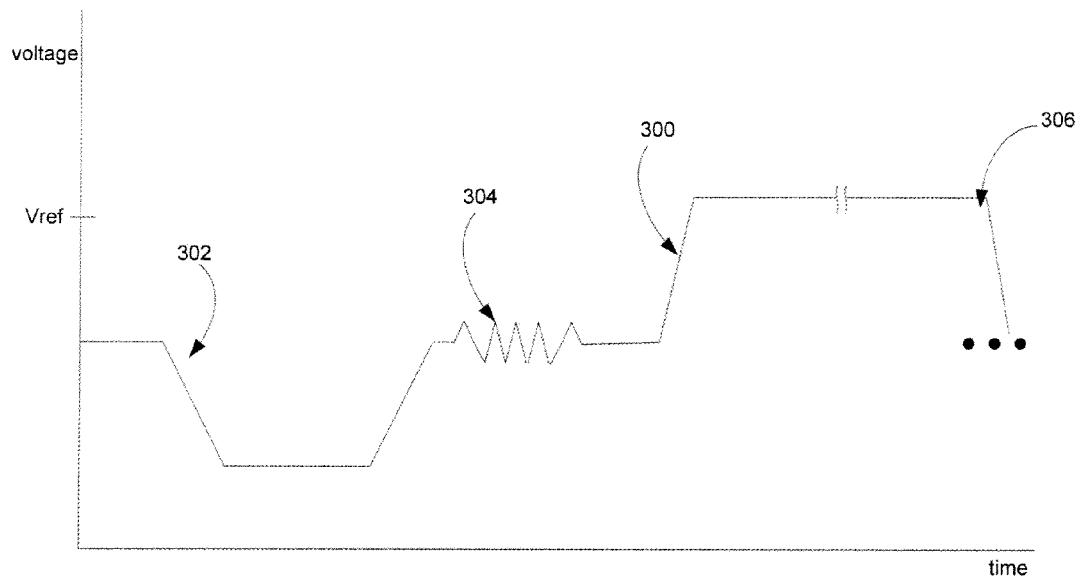
FIG. 3A and FIG. 3B illustrate a carrier signal and the carrier signal modulated with a digital television signal, according to an embodiment of the invention.
Figure 3B:
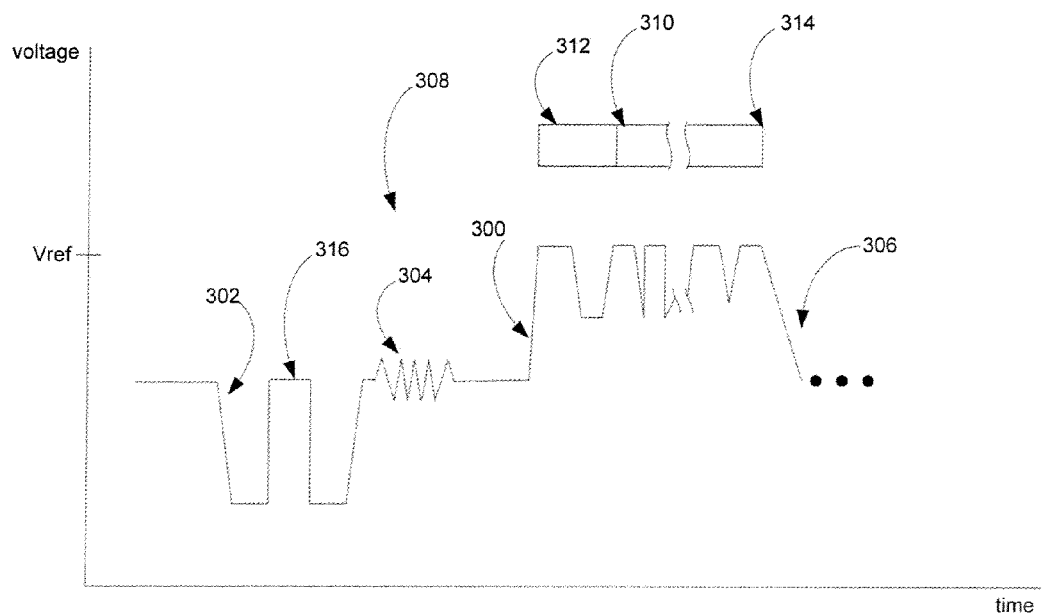

FIG. 3A illustrates a carrier signal 300 that can be modulated with a digital television signal, according to an embodiment of the invention. In the illustrated embodiment, the carrier signal 300 is a composite video waveform that includes a horizontal blanking interval 302, a color burst portion 304, and a video portion 306. FIG. 3B illustrates an output signal 308 that is generated by modulating the carrier signal 300 with a digital television signal. As can be appreciated, the digital television signal can be provided as a digital data stream, such as in the form of elementary stream packets, program stream packets, or transport stream packets. FIG. 3B illustrates one such packet 310, which includes a header portion 312 and a body portion 314. As illustrated in FIG. 3B, digital content included in the packet 310 is superimposed onto the video portion 306 of the carrier signal 300. It is contemplated that the digital content included in the packet 310 can be superimposed onto another portion of the carrier signal 300 in place of, or in conjunction with, the video portion 306. As illustrated in FIG. 3B, the digital content included in the packet 310 is superimposed onto the carrier signal 300 in accordance with a digital modulation scheme, namely a digital amplitude modulation scheme. In particular, a logical low state is represented by a signal level below a reference signal level $V_{ref}$, while a logical high state is represented by a signal level above the reference signal level $V_{ref}$. While a single packet is illustrated in FIG. 3B, it is contemplated that digital content included in multiple packets can be modulated onto the video portion 306.

As illustrated in FIG. 3B, the output signal 308 incorporates an indication of the digital television signal, such that a receiving device can detect the presence of the digital television signal. In the illustrated embodiment, the indication is represented by a pulse 316 that is superimposed onto the horizontal blanking interval 302 of the carrier signal 300. It is contemplated that the indication can be superimposed onto another portion of the carrier signal 300 or can be separately transmitted to the receiving device.

The second operation illustrated in FIG. 2 is to transmit the output signal via a communication channel associated with the analog television format (block 202). In the illustrated embodiment, the signal generator transmits the output signal to a set of output devices, which, in turn, transmits the output signal to the receiving device via the communication channel.

Figure 4:
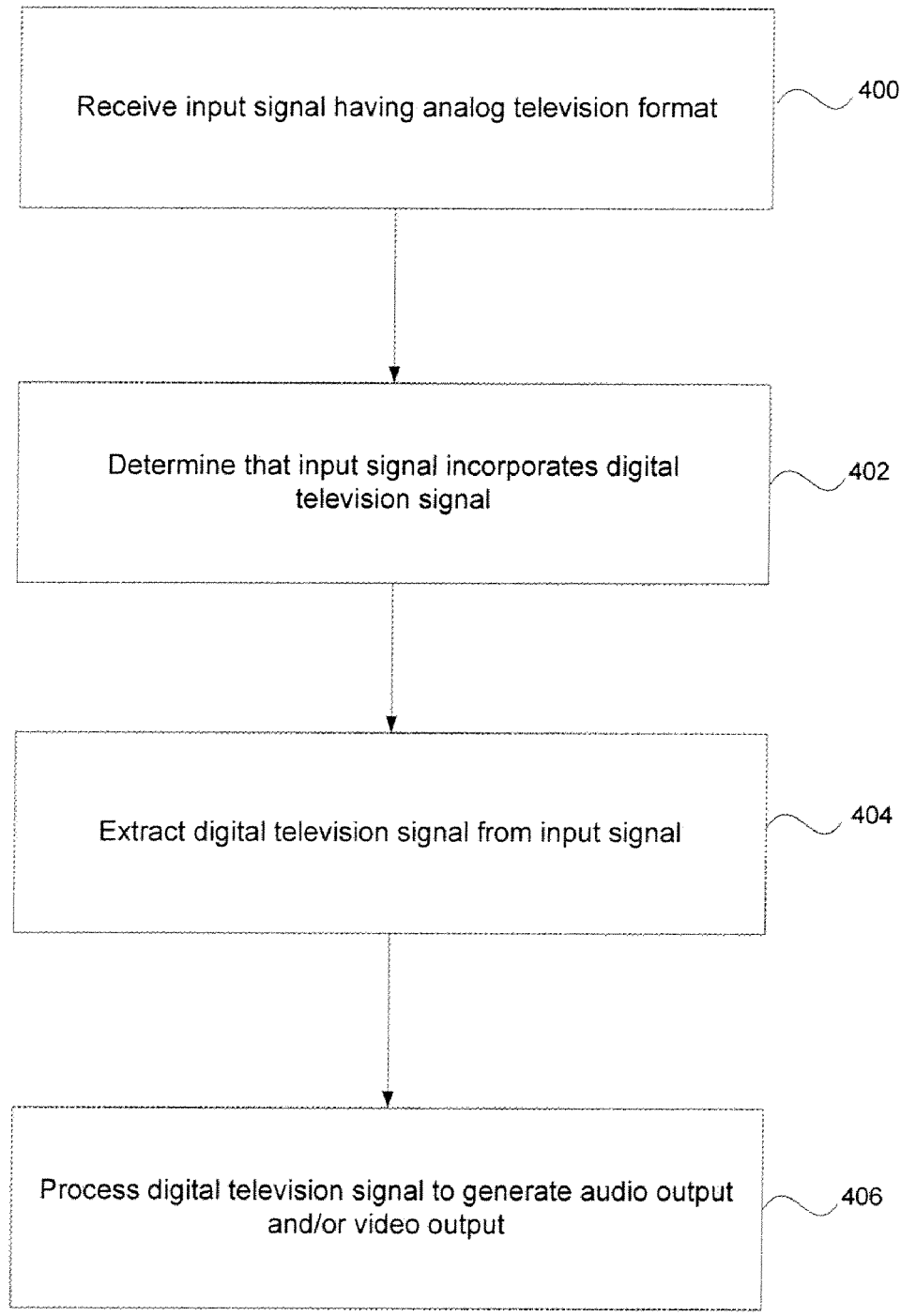
FIG. 4 illustrates a flowchart for processing a digital television signal, according to another embodiment of the invention.

Attention next turns to FIG. 4, which illustrates a flowchart for processing a digital television signal, according to another embodiment of the invention.

The first operation illustrated in FIG. 4 is to receive an input signal having an analog television format (block 400). In the illustrated embodiment, a decoder receives the input signal via an input port, and the input port is configured to receive signals having the analog television format. For certain implementations, the input port is a conventional video connector, such as a conventional composite video connector. Advantageously, the input port can serve as a common input port to receive analog television signals as well as digital television signals.

The second operation illustrated in FIG. 4 is to determine that the input signal incorporates the digital television signal (block 402). In the illustrated embodiment, the decoder includes a signal detector, and the signal detector detects the presence of the digital television signal based on identifying an indication that the input signal incorporates the digital television signal. As discussed previously, the indication can be incorporated in the input signal itself or can be separately transmitted to the decoder.

The third operation illustrated in FIG. 4 is to extract the digital television signal from the input signal (block 404). In the illustrated embodiment, the decoder includes a signal extractor, and the signal extractor extracts either of, or both, an audio content and a video content of the digital television signal from the input signal. For certain implementations, the digital television signal is extracted by demodulating the digital television signal from a carrier signal.

The fourth operation illustrated in FIG. 4 is to process the digital television signal to generate either of, or both, an audio output and a video output (block 406). In the illustrated embodiment, the decoder transmits either of, or both, the audio content and the video content of the digital television signal to an output engine via a bus, and the output engine processes such content to generate either of, or both, the audio output and the video output. For certain implementations, the bus is a conventional 8 or 16 bit bus, such as one implemented in accordance with the ITU-Recommendation 656. Advantageously, the bus can serve as a common bus to transmit contents of analog television signals as well as digital television signals.

It should be recognized that the embodiments of the invention discussed above are provided by way of example, and various other embodiments are encompassed by the invention. For example, it is contemplated that various other types of modulation schemes can be used in place of, or in conjunction with, the digital amplitude modulation scheme discussed in connection with FIG. 3A and FIG. 3B. Other types of modulation schemes that can be used include, for example, digital frequency modulation schemes and digital phase modulation schemes. It is also contemplated that an error detection scheme and an error correction scheme can be used in conjunction with generating and subsequent processing of the output signal 308.

With reference to FIG. 1, various components of the computer system 100 can be implemented in a number of ways, such as using hardwired circuitry, computer code, or a combination of hardwired circuitry and computer code. For example, the signal generator 108, the signal detector 122, the signal extractor 124, and the signal generator 136 can be implemented using hardwired circuitry in the form of, for example, Application-Specific Integrated Circuits ("ASICs") or Programmable Logic Devices ("PLDs"). As another example, one or more of the signal generator 108, the signal detector 122, the signal extractor 124, and the signal generator 136 can be implemented using computer code in place of, or in conjunction with, hardwired circuitry. Examples of computer code include machine code, such as produced by a compiler, and files containing higher-level code that are executed using an interpreter. Additional examples of computer code include encrypted code and compressed code.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A decoder configured to process an input signal having an analog television format, comprising:
    a signal detector, said signal detector being configured to determine whether said input signal incorporates a digital television signal; and
    a signal extractor connected to said signal detector, said signal extractor being configured to extract said digital television signal from said input signal based on determining that said input signal incorporates said digital television signal;
    wherein said signal detector is configured to determine that said input signal incorporates said digital television signal based on an indication of said digital television signal;
    wherein said signal detector is configured to identify said indication in a horizontal blanking portion of said input signal.

2. The decoder of claim 1, wherein said input signal is compliant with a composite video format.

3. The decoder of claim 1, wherein said signal extractor is configured to extract said digital television signal from a video portion of said input signal.

4. The decoder of claim 1, wherein said input signal includes a carrier signal that is modulated with said digital television signal, and said signal extractor is configured to extract said digital television signal from said input signal by demodulating said digital television signal from said carrier signal.

5. A processing apparatus comprising:
    an input port;
    a decoder connected to said input port, said decoder being configured to receive, via said input port a first input signal having an analog television format corresponding to one of a composite video format, a S-video format, and a component video format, said decoder being configured to determine that said first input signal incorporates a digital television signal, said decoder being configured to extract said digital television signal from said first input signal; and
    an output engine connected to said decoder, said output engine being configured to process said digital television signal to generate at least one of an audio output and a video output.

6. The processing apparatus of claim 5, further comprising:
    a bus connected between said decoder and said output engine, said bus being configured to transmit said digital television signal to said output engine.

7. The processing apparatus of claim 6, wherein said decoder is configured to convert said digital television signal into a digital audio/video format associated with said bus.

8. The processing apparatus of claim 7, wherein said decoder is configured to receive, via said input port, a second input signal having said analog television format, said second input signal corresponds to an analog television signal, and said decoder is configured to convert said analog television signal into said digital audio video format associated with said bus.

9. The processing apparatus of claim 8, wherein said bus is configured to transmit said converted analog television signal to said output engine, and said output engine is configured to process said converted analog television signal to generate at least one of an audio output and a video output.

10. The processing apparatus of claim 5, wherein said digital television signal is superimposed onto a video portion of said first input signal having said analog television format.

11. The processing apparatus of claim 10, wherein said digital television signal is superimposed onto said video portion in accordance with a digital amplitude modulation scheme.

* * * * *